United States Patent [19]

Goodman, Jr.

[11] 4,269,299
[45] May 26, 1981

[54] RESERVOIR FOR ROD-LIKE ARTICLES

[75] Inventor: Hubert C. Goodman, Jr., Midlothian, Va.

[73] Assignee: CIR-S.p.A.-Divisione SASIB, Bologna, Italy

[21] Appl. No.: 30,622

[22] Filed: Apr. 16, 1979

[51] Int. Cl.³ .................... B65G 47/26; B65G 37/00
[52] U.S. Cl. .................................. 198/347; 198/435
[58] Field of Search ............... 198/435, 347, 523, 560; 131/21 A, 21 B, 21 R

[56] References Cited

U.S. PATENT DOCUMENTS

| | | | |
|---|---|---|---|
| 3,535,069 | 10/1970 | Molins et al. | 198/347 |
| 3,561,585 | 2/1971 | McCombie | 198/572 |
| 3,858,708 | 1/1975 | Hollenton et al. | 198/347 |
| 3,948,276 | 4/1976 | Prandini . | |
| 4,042,094 | 8/1977 | Schmermund | 198/347 |

Primary Examiner—Joseph E. Valenza
Assistant Examiner—Brian Bond
Attorney, Agent, or Firm—Spencer & Kaye

[57] ABSTRACT

A reservoir for rod-like articles such as filter plugs comprises a lower hopper section for the curing of the filter plugs, an overlying upper buffer section in which the freshly produced filter plugs accumulate up to a predetermined maximum level, and elevator belts for feeding the freshly produced filter plugs into the reservoir in a zone which is located intermediately between the lower curing hopper and the upper buffer section. A substantially horizontal cover plate is movable, at the interior of the buffer section of the reservoir, in response to the variations of the level of the filter plugs in the buffer section. Suitable limit switches are operatively associated with the movable cover plate, and control the operation of the filter making machine and the delivery apparatus which receives the filter plugs from the bottom of the lower hopper section and conveys same to further processing.

1 Claim, 2 Drawing Figures

RESERVOIR FOR ROD-LIKE ARTICLES

BACKGROUND OF THE INVENTION

The present invention relates to a reservoir used for providing a link-up between a continuous filter making machine which produces filter plugs to be used for the making of filter tip cigarettes, and a delivery and conveying apparatus which supplies the filter plugs to subsequent operations, for example to a filter tip cigarette making machine. More particularly, the reservoir according to the invention serves both for the "curing" (i.e. drying and seasoning to the best conditions of use) of the freshly made filter plugs, and for compensating (buffer action) any variation of output of the filter making machine and of demand of the delivery and conveying apparatus. Generally, the reservoir object of the present invention can be used in continuous systems which process any type of rod-like articles.

SUMMARY OF THE INVENTION

As it is known, cigarette filters are made by continuous filter making machines, generally in the form of filter plugs presenting a length which is a multiple of a single filter, and are then fed, from a delivery station to another machine (usually the machine which unites the filters to the cigarettes) for subsequent processing.

The filter plugs freshly produced by a filter making machine, should be allowed to rest, before their delivery to subsequent processing, for a period of time which is required for their curing.

Also, it is necessary to provide for a buffer reservoir in order to compensate for any possible discrepancy between the production rate of the filter making machine and the demand rate (from the delivery apparatus) of filters for subsequent processing.

The present invention contemplates a substantially vertical reservoir which comprises a lower hopper section for the curing of the filters, an overlying upper buffer section in which the freshly produced filter plugs accumulate up to a predetermined maximum level, and feed means for feeding the freshly produced filter plugs into the reservoir in a zone which is located intermediately between the lower curing hopper and the upper buffer section. A substantially horizontal cover plate is movable, at the interior of the buffer section of the reservoir, in response to the variations of the level of the filter plugs in the buffer section. Suitable limit switches are operatively associated with the movable cover plate, and control the operation of the filter making machine (and feed means) and of the delivery and conveying apparatus.

The construction and operation of the filter plug reservoir according to the invention will appear evident from the following description of a preferred embodiment of same, made with reference to the attached drawings.

DESCRIPTION OF THE PREFERRED EMBODIMENT

Figure 1:
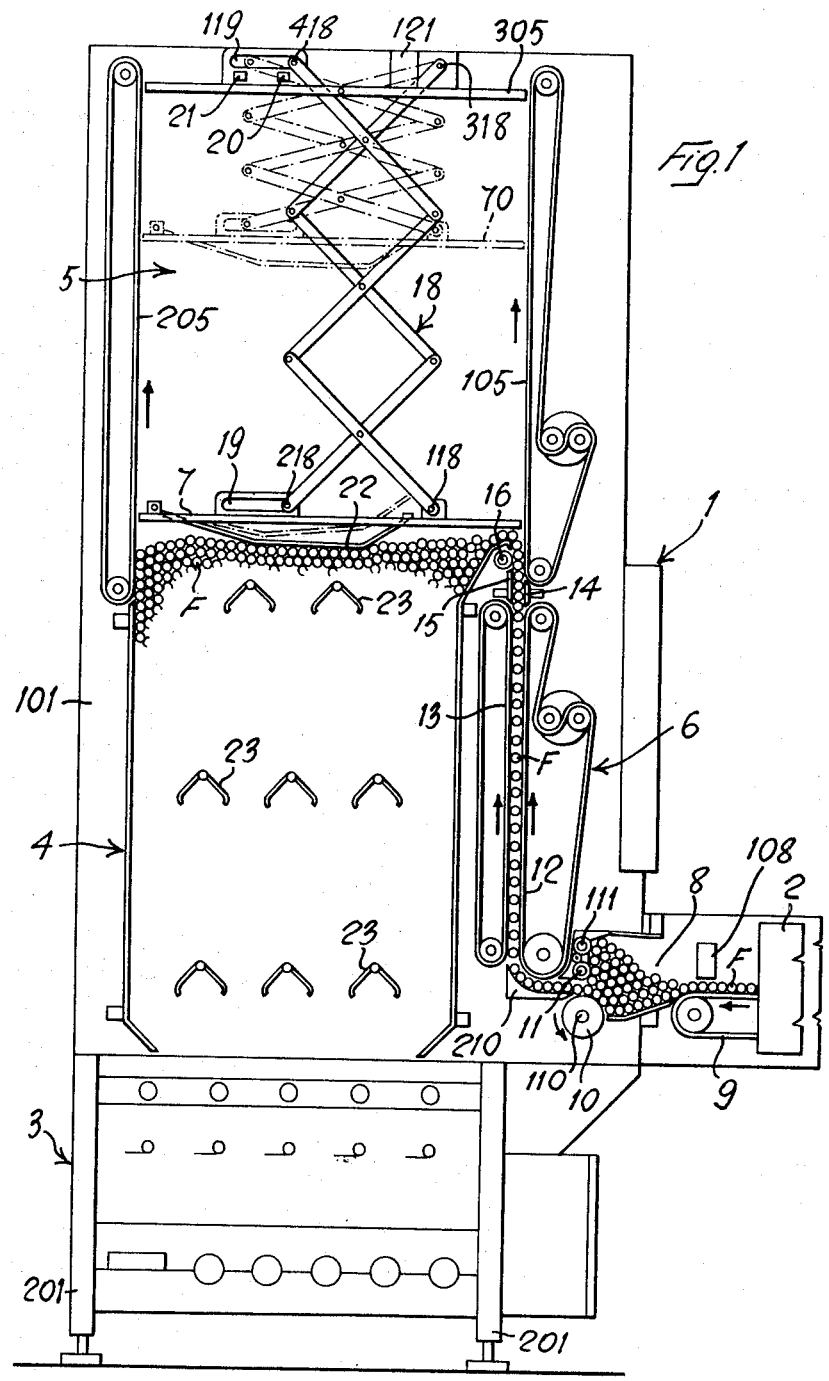
FIG. 1 is a diagrammatic side elevation view of the reservoir according to the invention.

Referring to the drawings, FIG. 1 shows a cigarette filter curing and buffer reservoir 1 which is interposed between a continuous filter making machine 2 and a delivery station 3 for feeding the filter plugs to a subsequent filter processing step.

The reservoir substantially comprises a lower hopper section 4 for the curing of the filter plugs F which through feed means 6 are fed from the filter-making machine in a continuous row into the said hopper 4, and an overlying buffer section 5 for compensating any variation of output and demand of the filter making machine and of the filter plug delivery station, respectively.

In the region of the curing hopper 4 the filter plugs F are allowed to stay for that amount of time which is sufficient for their curing, particularly for the drying or polymerization of the glue glueing together the lap seams of the paper wrappers enclosing the filter plug cores.

The buffer section 5 of the reservoir is closed by a plate 7 which bears on the upper level of the filter plugs F, and is moved up and down by the filter plugs which attain a more or less higher level in the buffer section.

The plate 7 is movably connected to the cover wall 305 of the buffer section 5 by means of a linkage 18 having a pantograph structure. This pantograph linkage 18 has its lower ends connected to plate 7 by means of a hinge 118 and a pin 218, respectively for a pivoting movement about hinge 118 and a sliding movement in guide slot 19. In a similar and corresponding manner, the upper end of linkage 18 above hinge 118 is hinged at 318, while the end above hinge 218 is slidable, by means of pin 418, in the guide slot 119.

Through the thus suspended plate 7, the level of the filter plugs in the buffer section 5 of the reservoir 1 is controlled by the limit switches 20,21,121 which, through a suitable control circuit, decreases the output rate of the filter making machine 2 as the reservoir is filled to an intermediate level and stop the supply of the filter plugs from the filter making machine 2 into the reservoir 1 when the plugs have filled the buffer section up to the predetermined highest level 70, while they cut off the outgoing delivery from the station 3 when the level of the filter plugs is down at the predetermined minimum level, that is to say, when the plate 7 lies just above the feed means 6.

One or more wands 22 are attached to the underside of plate 7, and are curved so as to fill any gap between plate 7 and the top surface of the filter plugs.

The filter plugs are fed into the reservoir 1 assembly by feed means 6 comprising a pick-up chamber or area 8 at the lower side of the curing hopper 4. In the pick-up chamber 8 there are fed the filter plugs F, which come from the filter making machine 2 through an endless belt 9.

In cooperation with a selecting roller 11 and a recirculating roller 111, a rotary suction drum 10 draws the accumulated filter plugs out of chamber 8. Since a plurality of superposed filter plugs are attracted by suction onto drum 10, the cooperation of the rollers 11, 111 with the drum 10 is required for obtaining (roller 11) one row of single filter plugs arranged side by side and for returning into the pick-up chamber 8 (roller 111) any excess filter plug removed from drum 10 by the selecting roller 11.

A photoelectric cell 108 senses the degree of filling of pick-up chamber 8. When this area is filled with filter plugs, the photocell actuates drum 10. When the area 8 is empty, the photocell 108 stops the rotation of drum 10, while the other components of the feed means 6, including also the elevator belts 12,13, are kept in operation for a short time, so as to allow a complete discharge into the reservoir of the filter plugs lifted between belts 12,13.

The filter plug row drawn out of the area 8 by drum 10 is guided along the curved path 210, so as to be caught between the parallel active runs of belts 12,13 of an endless belt elevator. The belts 12,13 are driven with a certain difference between their respective speeds, so that the filter plugs F lifted by these belts 12,13 are caused to roll about themselves a number of times, preferably two and a half revolutions, over the length of their upward movement. Such a rolling of the filter plugs about themselves (which is in the same direction as the rolling up of a paper wrapper enclosing the filter core of each plug) serves both for setting the plugs in good shape and for preventing the plugs from getting flattened.

At the end of the lifting between the upward runs of the elevator belts 12,13, the filter plug row is taken between and guided by a pair of parallel plates 14, 15. Each one of the filter plugs leading the row is then pinched between a pinch roll 16 and a circulation belt 105 which, together with the oppositely arranged similar belt 205, defines two facing walls of the buffer section 5 in which the vertically movable plate 7 is provided. The filter plugs drawn up between pinch roll 16 and belt 105 are discharged into the hopper section 4 at the boundary between the lower hopper region 4 and the bottom of the upper buffer section 5. The side belts are positively upwardly driven with a concordant motion, so as to induce thereby the upward displacement and the circulation of the filter plugs in the buffer reservoir, and to prevent any agglomeration into a mass of the still freshly glued filter plugs.

The filter plugs are fed by gravity from the buffer section 5 to the curing hopper 4 and thence into the delivery station 3. The curing hopper 4 has substantially the shape of an open-ended box in which roof-shaped load relievers 23 are provided for relieving the load and for dividing the flow of the filter plugs through the curing region, in order to prevent any agglomeration or crushing of the plugs arriving to the delivery station 3.

Figure 2:
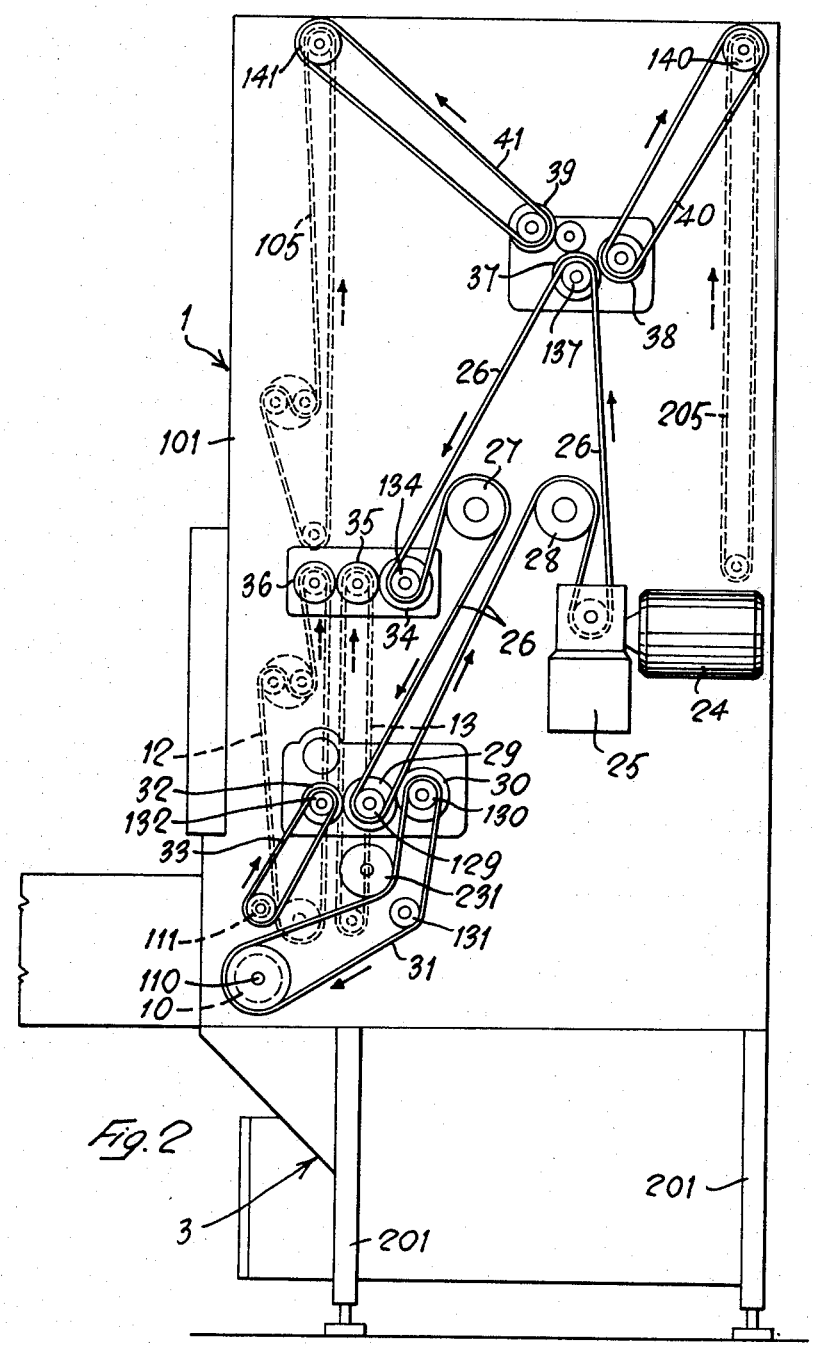
FIG. 2 is a diagrammatic elevation view showing the driving unit of the reservoir according to the invention.

Referring now to FIG. 2 of the drawings, there is shown the driving unit of the reservoir 1. The driving unit is mounted on the frame 101 carried by legs 201, and serves for driving the moving parts of the apparatus in accordance with the required operative steps and in dependence of the controls from the limit switches 20,21 and the photoelectric cell 106.

The driving unit is operated by the motor 24 which through the associated reduction unit 25 drives the main endless belt 26, whose main guide pulleys bear the reference numerals 27 and 28, respectively. A run of belt 26 which is wound around pulley 129 drives gear 29 in rotation, which gear 29 in turn causes gears 30 and 32 to be rotated at different speed ratios.

The endless belt 31 is driven by pulley 130 which is coaxially engaged to gear 30. This belt 31 is suitably guided on idler pulleys 131 and 231 and drives the shaft 110 of suction drum 10 through an electro magnetic clutch (not shown). At the same time, the endless belt 33 is driven by pulley 132 which coaxially engaged to the gear 32. Belt 33 drives the filter plug recirculating roller 111 which in turn drives the filter plug selecting roller 11 through another endless belt (not shown).

The main belt 26 passes over the pulley 134 which drives the coaxially engaged gear 34. The gear 34 drives gears 35 and 36, which in turn drive the endless belts 12 and 13 of the filter plug elevator.

The main belt 26 is also wound around a pulley 137 so as to drive in rotation a gear 37. In its turn, the gear 37 drives in rotation the gears 38 and 39, which are different in diameter and therefore have a different speed ratio. By means of the respective endless belts 40 and 41 and pulleys 140 and 141, these gears 38 and 39 drive the endless belts 105 and 205 which assist the circulating of the filter plugs in the buffer reservoir 5. The active runs of both belts 105 and 205 are thus driven in the same direction but at different speeds.

It is believed that the invention will have been clearly understood from the foregoing detailed description of one preferred embodiment. Changes in the details of construction may be resorted to without departing from the spirit of the invention, and is accordingly intended that no limitation be implied and that the hereto annexed claims be given the broadest interpretation to which the employed language fairly admits.

I claim:

1. A reservoir for rod-like articles, more particularly a reservoir for filter plugs, said reservoir coupling a continuous filter making machine and a delivery apparatus which conveys said filter plugs to subsequent processing apparatus, comprising in combination:

a lower vertical hopper section having a discharge bottom end and an open top end, the bottom end of said lower hopper section being connected to said delivery apparatus;

an upper vertical buffer section directly connected to said lower hopper section and freely communicating therewith at an intermediate boundary region, said upper vertical buffer section being provided with two opposing sidewalls comprising a pair of vertically disposed endless belts driven so that the inner facing rims of said belts move upwardly, said belts being driven at different speeds;

feed means for feeding a single row of rod-like articles into said reservoir in the vicinity of said intermediate boundary region, said feed means including a pick-up chamber to which said articles are fed and wherein they are accumulated;

a rotary suction drum for drawing said articles out of said pick-up chamber;

a selecting roller cooperating with said rotary suction drum to obtain a single row of said articles aligned side-by-side;

a pair of vertically disposed endless belts, each having a vertical run in spaced face-to-face relationship with a vertical run of the other belt, said pair of belts elevating said articles from a lower point adjacent the bottom of said buffer section to a higher point adjacent said intermediate boundary region between said buffer and hopper sections, said belts being driven at different speeds whereby the articles engaged between the facing runs of said belts are rolled around their longitudinal axes while being elevated; and discharge means for delivering said single row of articles from said belts into the reservoir at said intermediate boundary region, said discharge means including;

a pair of parallel spaced-apart plates, said single row of articles being fed between said plates;

a pinch roller adjacent the exit side of one of said plates; and a sidewall belt adjacent the exit side of the other of said plates and forming a sidewall of said upper buffer section, said pinch roller and said sidewall belt being driven so as to lead and discharge said articles into said reservoir;

level sensing means for sensing the level of said rod-like articles in said upper buffer section, said level sensing means comprising a substantially horizontal cover plate resting on the top level of the articles located within said upper buffer section and being vertically movable in response to variations in the maximum level of said articles;

control means actuated by said level sensing means in response to predetermined maximum and minimum levels of the articles in said buffer section, said control means controlling the operation of said feed means and said delivery apparatus; and a pantograph linkage coupled to said control means movably suspending said cover plate within said upper buffer section.

* * * * *